Figure 1:
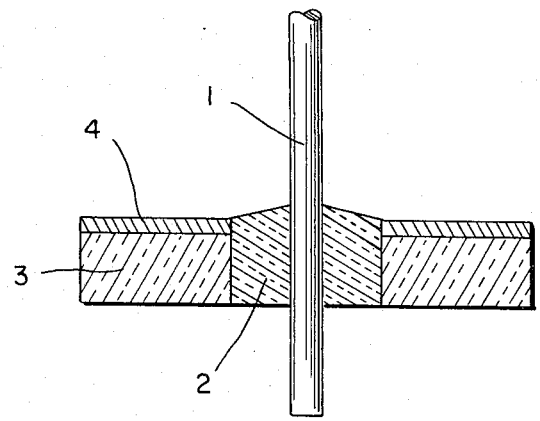

United States Patent [19]
Koons

[11] 3,770,404
[45] Nov. 6, 1973

[54] METAL-TO-GLASS-TO-CERAMIC SEAL

[75] Inventor: Edwin Russell Koons, Whiteland, Ind.

[73] Assignee: P. R. Mallory & Co. Inc., Indianapolis, Ind.

[22] Filed: Sept. 24, 1971

[21] Appl. No.: 183,707

Related U.S. Application Data

[62] Division of Ser. No. 3,158, Jan. 15, 1970, Pat. No. 3,638,076.

[52] U.S. Cl. .......................................... 65/59, 65/52
[51] Int. Cl. ............................................. C03c 27/02
[58] Field of Search ...................... 65/59, 36, 33, 42

[56] References Cited
UNITED STATES PATENTS

| | | | |
|---|---|---|---|
| 3,225,132 | 12/1965 | Baas et al. | 65/59 X |
| 3,436,109 | 4/1969 | Loose | 65/59 X |
| 3,467,509 | 9/1969 | Foster | 65/33 |
| 3,522,489 | 8/1970 | Sparrow et al. | 65/59 X |
| 3,275,901 | 9/1966 | Merrit et al. | 317/230 |
| 3,356,466 | 12/1967 | Wildeboer et al. | 29/191 |
| 2,100,187 | 11/1937 | Handrek | 287/189.365 |
| 2,206,489 | 7/1940 | Schedel | 174/50.56 |
| 3,275,358 | 9/1966 | Shonebarger | 287/189.365 |

*Primary Examiner*—Robert L. Lindsay, Jr.
*Attorney*—Henry W. Cummings

[57] ABSTRACT

A method of making a seal comprising a metal member bonded to a glass member, said glass member in turn bonded to a ceramic member, said glass member and said ceramic member being resistant to corrosive materials in the device being sealed, said metal member, glass member and ceramic member having compatible coefficients of thermal expansion.

9 Claims, 2 Drawing Figures

PATENTED NOV 6 1973　　　　　　　　　　　　　　　3,770,404

METAL-TO-GLASS-TO-CERAMIC SEAL

This is a division of application Ser. No. 3,158 filed Jan. 15, 1970, now U. S. Pat. No. 3,638,076.

This invention relates to a metal to glass to ceramic seal. The applications of such a seal include capacitors, as well as other applications where a hermetic metal-to-glass-to-ceramic seal is required. The problem of sealing a device containing a liquid in which the device is to operate at a temperature in excess of the boiling point of liquid has been a problem for some time in the electronic as well as chemical industries.

Insofar as capacitors are concerned, one solution to this problem has been the use of a metal to glass to stainless steel seal as disclosed in application Ser. No. 705,372, filed Feb. 14, 1968, now U.S. Pat. No. 3,515,950 assigned to the same assignee as this application. Electrolyte frequently utilized in this type of capacitor is sulfuric acid, and in the said application Ser. No. 705,372 it was found that the vapors of the acid failed to attack the stainless steel, rendering the seal of the hermetic or air tight type.

While this seal works very satisfactorily under most circumstances, it has been found that under some circumstances the plating on the base metal will be imperfect or will suffer a defect, and if this occurs the sulfuric acid then attacks the base metal and an air tight or hermetic seal is no longer maintained.

Furthermore, the cost of the metal to glass to base metal is expensive because of the metal layers required to affix the end seal to the capacitor can, as is described in greater detail in the said Ser. No. 705,372.

It therefore is an object of the present invention to provide a gas tight or hermetic seal for use in chemical and electrical applications.

Another object of the present invention is to provide a hermetic seal for use in capacitors which must withstand extreme temperature operations and/or environments.

It is another object of the present invention to provide a seal in which defects in the plating thereof do not result in substantial amounts of corrosion of said seal.

It is another object of the present invention to provide a seal which is inexpensive to manufacture.

It is another object of the present invention to provide a capacitor having a seal which is resistant to corrosion and can be operated at elevated temperatures.

It is another object of the present invention to provide a capacitor having a gas tight or hermetic seal which is inexpensive to manufacture.

Other objects will be apparent from the following description and drawing.

The foregoing objects are achieved by the hereinafter disclosed metal to glass to ceramic seal. For capacitor application the metal will generally be an anode riser and is preferably a film-forming metal and is more preferably film-forming metal of the same metal of which the anode of the capacitor is made. However, it will be apparent to those skilled in the art that the seal of the present invention can be utilized in connection with non-film-forming metal anode risers and has application in other areas such as in chemical processing and/or containers where the metal member is either a film-forming or a non-film-forming metal.

The first requirement of the seal of the present invention is that there be compatibility between the metal and glass members. This involves a consideration of the relative coefficients of expansion of these two components. Taking a film-forming metal tantalum for example, tantalum has a coefficient of thermal expansion of about $70 \times 10^{-7}$ inches per inch per °C. The coefficient of expansion of the glass member may be somewhat greater or somewhat less than the coefficient of expansion of the metal member. Thus in the case of tantalum the coefficient of expansion of the glass may be as low as about $50 \times 10^{-7}$ inches per inch per °C, or as high as about $100 \times 10^{-7}$ inches per inch per °C. Preferably, however, for tantalum the coefficient of expansion of the glass is between about 55 and about $90 \times 10^{-7}$ inches per inch per °C.

Depending upon whether the coefficient of expansion is larger, smaller or about the same as the metal member, the resulting seal may be respectively compression, tension or matched. All three of these type of seals are within the scope of the present invention.

Most preferably, the coefficient of thermal expansion of the glass is between 60 and $80 \times 10^{-7}$ inches per inch per °C for tantalum.

The glass also must have the property that it is essentially unattacked by acid or salt to be used in the system of which the seal is sealing. For example, in the case of capacitors containing an acid or salt electrolyte for example, sulfuric acid, it is important to ascertain that the glass is essentially unattacked by the electrolyte, i.e., acid.

Any glass meeting the foregoing requirements may be utilized in accordance with the present invention. One exemplary glass has been found to contain predominately silicon oxide and minor amounts of sodium oxide, potassium oxide, and additional oxides in even smaller amounts including one or more of chromium oxide, manganese oxide, cobalt oxide, lead oxide and/or calcium oxide. Manganese oxide, chromium oxide, cobalt oxide, silver oxide, lead oxide, calcium oxide and zinc oxide are optional substances and in some applications one or more of these substances may not be required. Furthermore, it will be apparent to those skilled in the art that many other glasses either having some or all of the foregoing oxide constituents or different oxide constituents, which have the necessary properties of coefficient of expansion and resistance to electrolyte attack may be used in the present invention.

The trade name of one exemplary glass meeting the foregoing requirements is Fusite Type GCS.

The ceramic member is bonded to the glass member and surrounds the glass member. While the shape of the ceramic member may vary widely including such shapes as a square, rectangle, elliptical, or parallelogram cross sections, the preferred cross sections for the ceramic member are circular and elliptical cross-sections.

The necessary properties of the ceramic member also include resistance to chemical attack by any liquid or vapors of which the seal is likely to come in contact. For example, in a capacitor utilizing acid electrolyte such as sulfuric, the ceramic member must be essentially unattacked by sulfuric acid vapors and preferably sulfuric liquid as well.

The coefficient of expansion of the ceramic member must be compatible with that of the glass. This does not mean that the coefficient of expansion of the ceramic member and the glass must be exactly the same, but they must be sufficiently close together that the glass is not broken or subjected to undue stress because of the difference in the coefficients of expansion between the two members. For applications in which the glass member has the hereinbefore given coefficient of expansion, the coefficient of expansion of the ceramic member may be from about 60 to about 90 × $10^{-7}$ inches per inch per °C. In an application directed to sealing tantalum, before sealing tantalum member this range is preferably about 64 to about 80 × $10^{-7}$ inches per inch per °C. The particular coefficient of expansion to be utilized within the broad range and preferred range, respectively, requires compatibility with the glass member. While this may vary from glass to glass and ceramic member to ceramic member, in general the difference in coefficient of expansion between the glass and ceramic member should not be more than about 15 × $10^{-7}$ inches per inch per °C, and preferably the difference in coefficient of expansion is not greater than about 10 × $10^{-7}$ inches per inch per °C.

In general the difference between the glass and metal member coefficients of expansion is preferably also within 15 and preferably 10 × $10^{-7}$ inches per inch per °C.

While any ceramic member having the foregoing properties may be utilized in the field of the present invention, one exemplary type of ceramic member which has been found to be satisfactory is ceramic members containing a predominant amount of alumina. Thus, according to one embodiment of the present invention, the ceramic member contains at least about 80 percent alumina, the balance other oxide materials including but not limited to silica, magnesia, calcium oxide, sodium oxide and potassium oxide, lead oxide, etc. The upper limit of alumina content is about 99.9 percent. The preferred alumina range is from about 84 percent to 99 percent. Up to the extent of about 20 percent, however, alumina may be substituted with titania because of the similar chemical properties and coefficient of expansions of these two substances. More specifically, one exemplary product which has been found satisfactory is the alumina sold by American Lava Corporation containing 90–99 percent alumina known in the trade as Alsimag, Nos. 771, 614, 748 and 753.

It should be emphasized that other film-forming or non-film-forming metals may be utilized in the seal of the present invention. Exemplary non-film-forming metals include Kovar, rodar, invar and other nickel, cobalt, or iron containing alloys.

In utilizing non-film-forming metal members, or non-tantalum film-forming metal members, the range of coefficients of expansion must be adjusted according to the coefficient of expansion of the particular metal member. Glass and ceramic members having coefficients of expansion either above or below that of the metal may be used, with the extent of the difference being approximately as indicated hereinbefore in the case of tantalum. Thus those skilled in the art would have little difficulty adopting the teachings of the present invention to both film-forming and non-film-forming metal members.

One exemplary method of forming the metal to glass to ceramic seal is as follows. The metal members are mounted in a suitable fixture. The fixture holds one or a plurality of metal members vertically. The fixture has an upper supporting portion wherein the ceramic members are placed around the metal member, by virtue of the opening in the ceramic members. Then small quantities of glass sufficient to fill the space between the metal member and ceramic member is placed in the opening between the two.

The so-assembled fixture is placed in a furnace, preferably in an inert atmosphere controlled furnace, for example containing nitrogen, argon, helium, crypton or mixtures thereof, and is heated up to elevated temperature, preferably between 900°–1,200° C. The absolute upper limit of the temperature is the melting point of either the ceramic member and/or the metal member. At elevated temperature the glass will melt and flow into place around the metal member, filling the space between the metal member and the ceramic member in at least a portion of the thickness of the ceramic member.

After the molten glass is in place surrounding the metal member, the device is slowly cooled. During the slow cooling operation, for example at a rate of 5° to 10° C per minute, the glass sets. While the inside diameter of the ceramic member increases during heating it decreases during the cooling operation, resulting in a compression seal, a matched seal or a tension seal, depending upon the relative coefficient of expansion of the metal, glass and ceramic members, as hereinbefore discussed.

The so-called seal is then ready for insertion into the device to be sealed. For capacitor applications, it may be desirable to apply a paste or coating upon the ceramic member for purposes of welding, soldering or brazing the seal to the inside of a capacitor can. For this purpose, metals which are non-reactive with the electrolyte are preferred. For example, in the case of an acid electrolyte such as sulfuric silver, gold and platinum metals and alloys of these metals may be used. Rather than apply these directly to the ceramic, a better bond is achieved through the use of a glass binder containing a substantial amount of silica. The metalization, with or without the binder, may be applied by dipping or coating to the ceramic member by methods known in the application and coating arts. After this, the seal is welded, brazed and/or soldered to the capacitor can.

FIG. 1 is a transverse vertical section of a typical seal. The terminal (1) passes through a mass of glass (2) which is fused to the ceramic ring (3). Attachment to the seal may be done by soldering, brazing or welding of the metallized ring (4) on the external surface of the seal as shown by reference number 9 in FIG. 2. An elongated terminal 7 may be suitably affixed to the case 6 by welding, soldering, brazing and the like.

Figure 2:
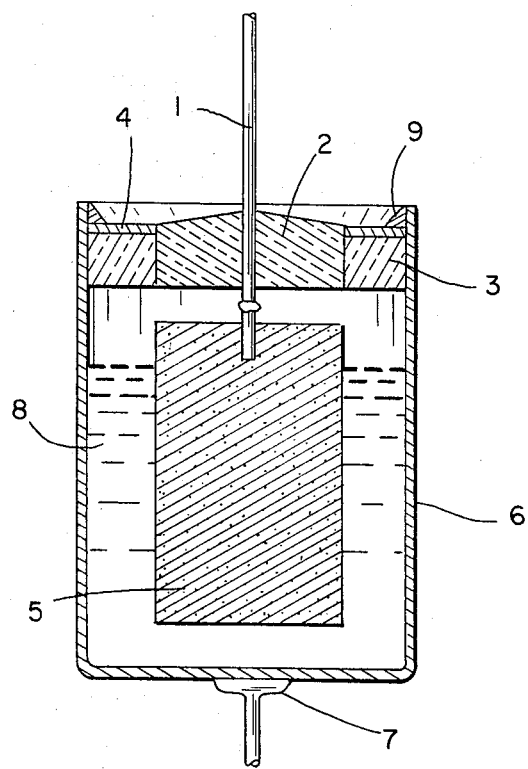

An exemplary completed capacitor utilizing such a seal is shown in FIG. 2. An anode (5), preferably but not necessarily made of the same film-forming metal as the terminal, is affixed to the terminal which extends through the seal. The electrolyte (8) is filled into the case (6) to a substantial extent and the anode — seal assembly inserted therein. The anode — seal assembly may be secured to the case by welding, brazing or soldering.

The capacitor case may be fabricated from any non-corrosive metals and/or alloys. For example, stainless steel, silver, silver plated stainless steel, silver clad stainless steel, gold clad silver, gold clad stainless steel, gold clad silver stainless steel, gold clad copper base alloys, gold clad silver clad to copper base alloys.

I claim:

1. A method of making a capacitor including the steps of providing an elongated dielectric film-forming metal means spaced from the side wall of and in an aperture of an apertured ceramic means and a sufficient quantity of glass to substantially completely fill space between the elongated metal means and the side wall of the aperture of the apertured ceramic means, causing the glass to flow to fill space between the elongated metal means and the side wall of the ceramic means at a temperature below the temperatures at which the elongated metal means and the ceramic means flow, bonding the glass to the elongated metal means and the side wall of the aperture of the apertured ceramic means to form a metal-to-glass-to-ceramic seal wherein the difference in the coefficient of expansion between the glass and the ceramic means is about $15 \times 10^{-7}$ inches per inch per °C or less, and closing an open end of a case containing an anode of film-forming metal and a liquid electrolyte by joining the metal-to-glass-to-ceramic seal to the side wall of case to provide a capacitor.

2. The method of claim 1, including the further step of, prior to the step of closing the open end of the case, attaching weldable, solderable or brazable means to the ceramic portion of the metal-to-glass-to-ceramic seal, the means being substantially chemically inert with respect to the electrolyte.

3. The method of claim 2, wherein the weldable, solderable or brazable means is a metal containing means extending to adjacent the case.

4. The method of claim 3, wherein the step of joining the seal to the side wall of the case includes welding, soldering or brazing the metal containing means to the side wall of the case.

5. The method of claim 1, including the further step of, prior to the step of closing the open end of the case, metallizing the ceramic means.

6. The method of claim 1, including the further step of, prior to the step of closing the open end of the case, attaching to the ceramic portion of the glass-to-metal-to-ceramic seal weldable, solderable or brazable means substantially chemically inert with respect to the electrolyte, the means attached to the external surface of the seal during closing of the open end of the case.

7. A method of making metal-to-glass-to-ceramic seal including the steps of providing an elongated metal means spaced from the side wall of and in an aperture of an apertured ceramic means and a sufficient quantity of glass to substantially completely fill space between the elongated metal means and the side wall of the aperture of the apertured ceramic means, causing the glass to flow to fill the space between the elongated metal means and the side wall of the ceramic means at a temperature below the temperature at which the elongated metal means and the ceramic means flow, bonding the glass to the elongated metal means and the side wall of the aperture of the apertured ceramic means to form a metal-to-glass-to-ceramic seal, and attaching weldable, solderable or brazable means to the ceramic portion of the metal-to-glass-to-ceramic seal.

8. The method of claim 7, wherein the weldable, solderable or brazable means is a metal containing means extending to about the periphery of the ceramic means.

9. The method of claim 7, wherein the elongated metal means is a dielectric film forming metal.

* * * * *

UNITED STATES PATENT OFFICE
CERTIFICATE OF CORRECTION

Patent No. 3,770,404　　　　　　　　　Dated　11-6-73

Inventor(s)　Edwin R. Koons

It is certified that error appears in the above-identified patent and that said Letters Patent are hereby corrected as shown below:

Column 6, line 18, change "fill the space" to ---fill space---

Signed and sealed this 17th day of September 1974.

(SEAL)
Attest:

McCOY M. GIBSON. JR.　　　　　　　　　C. MARSHALL DANN
Attesting Officer　　　　　　　　　　　Commissioner of Patents